W. M. STUDEBAKER AND H. J. EPPLE.
SEPARATOR FOR STORAGE BATTERIES.
APPLICATION FILED JULY 17, 1920.

1,375,740.

Patented Apr. 26, 1921.

WITNESSES

INVENTOR
Walter M. Studebaker, & Herbert J. Epple,

BY
ATTORNEYS

UNITED STATES PATENT OFFICE.

WALTER MARION STUDEBAKER AND HERBERT JOHN EPPLE, OF ERIE, PENNSYLVANIA.

SEPARATOR FOR STORAGE BATTERIES.

1,375,740.   Specification of Letters Patent.   Patented Apr. 26, 1921.

Application filed July 17, 1920. Serial No. 397,034.

*To all whom it may concern:*

Be it known that we, WALTER MARION STUDEBAKER and HERBERT JOHN EPPLE, citizens of the United States, and residents of Erie, in the county of Erie and State of Pennsylvania, have invented certain new and useful Improvements in Separators for Storage Batteries, of which the following is a specification.

Our invention relates to separators for secondary batteries, and particularly to that class of separators formed of glass.

We are aware that it has been hitherto proposed to form separators of compositions including glass or glass alone molded into the form of separators, but in all glass separators with which we are familiar, they are so brittle as to be readily broken by the warping of the electrodes, and are not sufficiently porous to permit of the full and uniform passage of the electrolyte therethrough.

It is a purpose of our invention to overcome these difficulties by forming a separator which is sufficiently flexible to prevent breaking under the warping of the electrodes, and of the requisite porosity to insure an evenly distributed penetration of the electrolyte to all parts of the electrodes. We are aware that spun glass has been previously used in various arts for various purposes, but we believe we are the first to discover that spun glass is particularly adapted in the making of separators.

In carrying out our invention, strands of spun glass of suitable length and of the desired fineness are arranged in groups so as to provide substantially thick strands. These strands are preferably arranged to extend both longitudinally and transversely of the separator, and are interwoven in any desired manner so long as an interlocking of the several strands is effected to maintain them in a separator formation.

Figure 1:
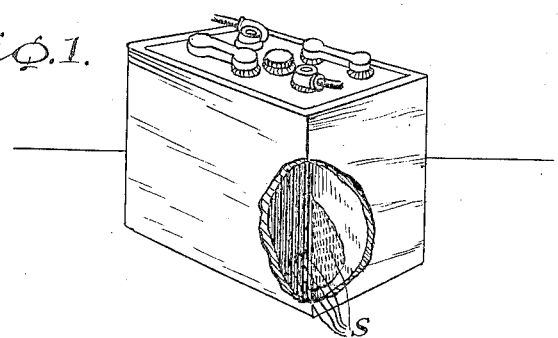

In Figure 1 of the accompanying drawings we have shown a conventional form of secondary battery with a portion thereof broken away to show the separators, constructed in accordance with our invention, in applied position between the electrodes.

Figure 2:
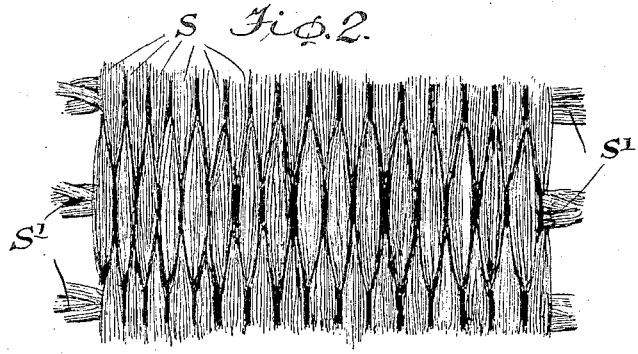
Figure 3:

In Fig. 2 is shown a portion of one of the separators embodying our invention made up of vertical strands S and horizontal strands S', all of which are formed of spun glass, with the horizontal strands plaited in the manner shown in Fig. 3.

As shown in Fig. 3, the alternate vertical strands S are trained over and under the horizontal strands S', while the remaining strands are arranged reversely with respect to the horizontal strands.

By this construction it will be manifest that strands of relatively small cross section can be employed to form a relatively thin separator which in its applied position between the electrodes of a battery permits of a much closer assembly of the electrodes thereby lessening the internal resistance of the battery. As the strands of spun glass are extremely tough, it will be clear that by employing a plurality of strands arranged in groups as in Fig. 2, a separator of great durability is provided, at the same time being sufficiently flexible to conform to the warping of the electrode without in any way disrupting the strands.

Although we have herein shown and described only one form of separator embodying our invention, it is to be understood that various changes and modifications may be made herein without departing from the spirit of the invention and the spirit and scope of the appended claims.

We claim:

1. A separator comprising, strands of spun glass arranged in intersecting groups, the groups of strands extending in one direction being plaited, and the strands of the groups extending in the other direction being trained over and under the groups of strands which extend in the first direction.

2. A separator comprising, strands of spun glass arranged in intersecting groups, each of the horizontal groups being plaited, and the vertical groups being trained over and under each of the horizontal groups.

WALTER MARION STUDEBAKER.
HERBERT JOHN EPPLE.